(12) United States Patent
Recourt et al.

(10) Patent No.: US 9,447,969 B2
(45) Date of Patent: Sep. 20, 2016

(54) LOW NOX COMBUSTION PROCESS AND BURNER THEREFOR

(75) Inventors: Patrick Recourt, Marcoussis (FR); Rémi Tsiava, Saint Germain-les-Corbeil (FR)

(73) Assignee: L'Air Liquide Société Anonyme Pour l'Étude Et l'Exploitation des Procedes Georges Claude, Paris (FR)

( * ) Notice: Subject to any disclaimer, the term of this patent is extended or adjusted under 35 U.S.C. 154(b) by 387 days.

(21) Appl. No.: 14/005,447

(22) PCT Filed: Mar. 9, 2012

(86) PCT No.: PCT/EP2012/054175
§ 371 (c)(1),
(2), (4) Date: Sep. 16, 2013

(87) PCT Pub. No.: WO2012/123382
PCT Pub. Date: Sep. 20, 2012

(65) Prior Publication Data
US 2014/0004469 A1 Jan. 2, 2014

(30) Foreign Application Priority Data

Mar. 16, 2011 (EP) ..................................... 11305294

(51) Int. Cl.
*F23C 1/08* (2006.01)
*F23D 14/58* (2006.01)
(Continued)

(52) U.S. Cl.
CPC .................. *F23D 14/58* (2013.01); *F23C 1/08* (2013.01); *F23C 1/10* (2013.01); *F23C 1/12* (2013.01);
(Continued)

(58) Field of Classification Search
CPC .......... F24D 14/24; F24D 14/32; F24D 14/58
USPC .............. 431/9, 115, 181, 182; 110/262, 264
See application file for complete search history.

(56) References Cited

U.S. PATENT DOCUMENTS 3,788,065 A * 1/1974 Markowski ............... F23R 3/34
431/173
4,679,512 A * 7/1987 Skoog ..................... F23C 7/004
110/262

(Continued)

FOREIGN PATENT DOCUMENTS

EP 0 754 912 1/1997
EP 2 141 413 1/2010

(Continued)

OTHER PUBLICATIONS

International Search Report for PCT/EP2012/054175, mailed Jun. 4, 2012.

*Primary Examiner* — Gregory Huson
*Assistant Examiner* — Nikhil Mashruwala
(74) *Attorney, Agent, or Firm* — Christopher J. Cronin

(57) ABSTRACT

Method of combusting a fuel with an oxidizer and corresponding burner assembly, whereby a jet of fuel and a jet of primary oxidizer are injected into a combustion zone in contact with one another so as to generate a primary fuel-rich flame, a swirling first peripheral gas jet is injected through a first passage around the fuel jet and primary oxidizer jets and a swirling second peripheral gas jet is injected through a second passage around the first peripheral gas jet and whereby a jet of secondary oxidizer is injected through a passage into the combustion zone between the first and second peripheral gas jets.

11 Claims, 1 Drawing Sheet

(51) Int. Cl.

| | |
|---|---|
| *F23C 1/10* | (2006.01) |
| *F23C 1/12* | (2006.01) |
| *F23D 1/02* | (2006.01) |
| *F23D 11/10* | (2006.01) |
| *F23D 14/24* | (2006.01) |
| *F23L 7/00* | (2006.01) |
| *F23D 14/32* | (2006.01) |

(52) U.S. Cl.
CPC ............... *F23D 1/02* (2013.01); *F23D 11/107* (2013.01); *F23D 14/24* (2013.01); *F23D 14/32* (2013.01); *F23L 7/007* (2013.01); *F23D 2900/00006* (2013.01); *F23L 2900/07005* (2013.01); *F23L 2900/07007* (2013.01); *Y02E 20/344* (2013.01)

(56) References Cited

U.S. PATENT DOCUMENTS

| | | | |
|---|---|---|---|
| 4,718,359 A | 1/1988 | Skoog | |
| 4,846,666 A * | 7/1989 | Bilawa et al. | ................. 431/8 |
| 5,257,927 A * | 11/1993 | Lang | ............... F23C 7/006 |
| | | | 239/402.5 |
| 5,411,394 A | 5/1995 | Beer et al. | |
| 6,315,551 B1 * | 11/2001 | Salzsieder et al. | ........... 431/183 |
| 2007/0281265 A1 * | 12/2007 | Sarv | ................. F23D 1/00 |
| | | | 431/187 |
| 2010/0003625 A1 * | 1/2010 | Ohlsen et al. | ................. 431/181 |
| 2010/0275825 A1 | 11/2010 | Bool, III et al. | |

FOREIGN PATENT DOCUMENTS

| | | |
|---|---|---|
| WO | WO 00 79182 | 12/2000 |
| WO | WO 02 081967 | 10/2002 |
| WO | WO 2004 094902 | 11/2004 |
| WO | WO 2005 059438 | 6/2005 |
| WO | WO 2005 059439 | 6/2005 |
| WO | WO 2008 007016 | 1/2008 |
| WO | WO 2009 090232 | 7/2009 |
| WO | WO 2009 136366 | 11/2009 |
| WO | WO 2011 010160 | 1/2011 |

* cited by examiner

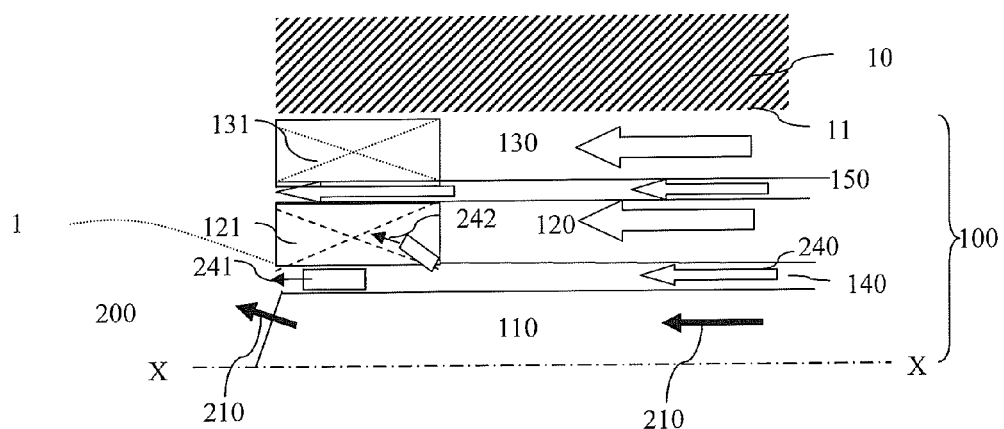

LOW NOX COMBUSTION PROCESS AND BURNER THEREFOR

CROSS-REFERENCE TO RELATED APPLICATIONS

This application is a §371 of International PCT Application PCT/EP2012/054175, filed Mar. 9, 2012, which claims §119(a) foreign priority to EP patent application EP11305294.8, filed Mar. 16, 2011.

BACKGROUND

1. Field of the Invention

The present invention relates to highly flexible combustion equipment and a highly flexible process capable of operating with both oxygen and with a combination of oxygen and air, as fuel combustion oxidizer.

2. Related Art

Thermal processes in which the thermal energy comes from the combustion of a fuel face ever stricter environmental constraints, in particular in terms of $CO_2$ and NOx emissions. Examples of such thermal processes are, for example, steam generation in boilers and melting processes in furnaces.

The two most prevalent techniques used to reduce NOx emissions are low-NOx burners and flue gas recirculation (FGR) burner systems.

Low-NOx burners reduce NOx emissions by accomplishing the combustion process in stages: i.e. by staging the injection of the fuel and/or of the oxidizer. Staging partially delays the combustion process, resulting in lower combustion temperatures, it being known that higher combustion temperatures contribute to NOx generation.

The two most common types of low-NOx burners for natural-gas fired boilers are staged air injection burners and staged fuel injection burners. NOx emission reductions of 40% to 85% have been observed with low NOx burners compared to non-staged burners.

In an FGR system, a portion of the flue gases generated by the combustion is recycled from the stack to the burner windbox. The recycled flue gas reduces NOx emissions by two mechanisms. It firstly reduces nitrogen concentrations in the combustion zone and secondly acts as an inert or ballast to reduce the oxygen concentration and thereby the combustion temperature.

FGR is normally used with specially designed low-NOx burners capable of sustaining a stable flame even with increased inert gas flow.

In the present context, the term "inert" is used to refer to substances or flows which, in the given process, do not as such contribute to heat generation by combustion, i.e. the inert gas is neither a combustion fuel nor a combustion oxidizer under the given combustion process parameters.

Examples of known low-NOx burners are described in inter alia WO00/79182, WO 02/081967, WO 04/094902, WO 2005/059438 and WO 2005/059439.

Examples of known FGR burner systems are described in inter alia WO 2008/007016, WO 2009/090232 and WO 2009/136366.

A specific example of a low-NOx combustion method and burner with FGR is proposed in U.S. Pat. No. 5,411,394 on the basis of an experimental parameter study. In accordance with this known method there is provided a burner having a chamber with an insertion region, said insertion region including a low divergence fuel nozzle arranged on a burner axis and first, second and third concentric nozzles. Each said nozzle is arranged at increasing radii from said axis and is arranged to introduce flow to said chamber from substantially the same axial location. Fuel is injected through said fuel nozzle to form a combustible fuel flow along said axis. A concentric flow formed by first, second and third successively concentric component flows, including oxidant gases, is injected through said first, second and third concentric nozzles. The fuel flow and the concentric flow are stratified to limit mixing of oxidant gases with said fuel flow so as to maintain a high-temperature fuel rich core zone near the insertion region and to induce mixing with oxidant gases in a lower temperature recirculation zone spaced from said insertion region. Stratification is achieved by providing a combination of a radial density gradient from low density, high temperature in said core zone close to the axis to higher density, lower temperature spaced radially from said core and by swirling said concentric flow. The fuel pyrolizes in the high-temperature fuel-rich core zone near said insertion region, where the mixing of oxidant gases with said fuel is limited by the stratifying. The product of said high temperature fuel-rich core zone is combusted in the lower-temperature recirculation zone spaced from said insertion region, where mixing of ambient gases is induced. According to U.S. Pat. No. 5,411,394, the use of small amounts of flue effluent in the primary air and/or tertiary air flow to deplete the oxygen concentration of the air flow and the flame temperature is a particular aspect for reducing NOx emissions.

In certain other cases, in particular in furnaces shielded from the ambient nitrogen-rich air atmosphere, oxygen-fuel combustion (as opposed to air-fuel combustion) is an option for reducing NOx generation due to the lower or even zero nitrogen content in the oxidizer. Also due to the lower nitrogen content of the oxidizer, oxygen-fuel combustion can also be of interest for reducing $CO_2$ emissions. Indeed, due to the lower nitrogen concentration and thus the higher $CO_2$ concentration in the oxygen-fuel combustion flue gases, $CO_2$ capture and sequestration becomes an option.

An example of a low-NOx oxygen-fuel burner is described in EP-A-0754912.

From an environmental point of view, there is a clear need for low-NOx oxygen-fuel combustion equipment and processes.

In spite of this, a major portion of thermal processes still rely on air-fuel combustion for the generation of thermal energy, and oxygen-fuel combustion has been slow to conquer the industry.

This can at least in part be explained as follows.

The established air-fuel combustion plants, with which the industrial operator is familiar, often do not have the proper geometry or the proper equipment to operate with oxygen instead of air as the combustion oxidizer. One reason for this is that the use of oxygen instead of air significantly alters the heat transfer modes, the concentrations of combustion product species and the pressure regimes within the combustion chamber and possible downstream heat transfer areas.

Known oxygen-fuel combustion plants likewise do not usually have the proper geometry or the proper equipment to operate with air instead of oxygen as the combustion oxidizer.

When designing or constructing a plant, the operator therefore has to select the oxidizer with which the combustion plant is to operate.

Hence, in spite of the well-known advantages of oxygen-fuel combustion as regards reduced pollution and increased energy efficiency, many plant operators are reluctant to construct oxygen-fuel combustion plants, in particular for those processes for which the environmental constraints currently do not impose or commercially justify oxygen-fuel operation.

SUMMARY OF THE INVENTION

It is an aim of the present invention to provide combustion equipment, such as in particular burners, to promote environmentally oxygen-fuel combustion thermal processes.

Thereto, the invention aims to overcome the reluctance of industrial operators to build installations only suitable for oxygen-fuel combustion.

The invention intends to achieve this goal by providing combustion equipment which, although suitable for air-fuel combustion, is also suitable for oxygen-fuel combustion and for oxygen-enriched air-fuel combustion within a same geometry.

It is a further aim of the present invention to provide a combustion process suitable for replacing air-fuel combustion with oxygen-fuel combustion and/or with oxygen-enriched air-fuel combustion.

The present invention provides a burner assembly which comprises a fuel injection passage for injecting a jet of fuel into a combustion zone and a primary oxidizer injection passage for injecting a jet of primary oxidizer into the combustion zone. The primary oxidizer injection passage is designed to inject the jet of primary oxidizer in contact with the jet of fuel injected by the fuel injection passage so as to generate a primary flame in the combustion zone.

The burner assembly further comprises a first peripheral gas injection passage for injecting a first peripheral gas jet into the combustion zone and a second peripheral gas injection passage for injecting a second peripheral gas jet into the combustion zone. The first peripheral gas injection passage surrounds the fuel injection passage and primary oxidizer passage so as to inject the first peripheral gas jet into the combustion zone around the fuel jet and the primary oxidizer jet, i.e. around the primary flame.

A second peripheral gas injection passage surrounds the first peripheral gas injection passage, and therefore indirectly also the fuel injection passage and the primary oxidizer injection passage, so as to inject the second peripheral gas jet into the combustion zone around the first peripheral gas jet, and indirectly also around the primary flame.

The first peripheral gas injection passage is equipped with a first swirler for conferring to the first peripheral gas jet a swirl (referred to as "first swirl) with respect to the primary flame. The second peripheral gas injection passage is likewise equipped with a second swirler for conferring to the second peripheral gas jet a swirl (referred to as "second swirl") with respect to the primary flame.

In accordance with the present invention, the burner assembly further comprises a secondary oxidizer injection passage for injecting a jet of secondary oxidizer into the combustion zone. The secondary oxidizer injection passage is located between the first and the second peripheral gas injection passages.

In the context of the present invention, the term "surround" is to be interpreted as follows:
 passage A "surrounds" passage B when passage A encompasses or encircles passage B in the longitudinal direction, i.e. in the flow or propagation direction of the fluids passing through the passages (fuel, oxidizer, peripheral gas) and fluid jet A "surrounds" fluid jet B or flame B when fluid jet A encompasses or encircles fluid jet B or flame B in the flow or propagation direction of the fluids.

In the context of the present invention, "swirl" of a jet means a swirl movement of the jet about its axis. Swirlers for conferring a swirl to a fluid jet are well known in the art. In the context of the present invention, vane-swirlers are preferred.

The primary and the secondary oxidizer injection passages are suitably connected to a source of oxygen-rich gas having an oxygen content of between 80% vol and 100% vol. The first and second peripheral gas injection passages are suitably each connected to a source of air or to a source of a ballast gas containing from 0% vol to 19% vol oxygen and from 0% vol to 50% vol nitrogen.

The first peripheral gas jet is injected in the combustion zone from the first peripheral gas injection passage through a first peripheral injection cross section area. The second peripheral gas jet is injected in the combustion zone from the second peripheral gas injection passage through a second peripheral injection cross section area. The jet of secondary oxidizer is injected into the combustion zone from the secondary oxidizer injection passage through a secondary oxidizer injection cross section area. Preferably, the secondary oxidizer injection cross section area is one tenth to one thirtieth of the sum of the first and the second peripheral injection cross section areas. Advantageously, the secondary oxidizer cross section area is one fifth to one fifteenth of the first and/or of the second peripheral injection cross section area. The injection cross section area refers to the total cross section area through which the corresponding jet is injected and may correspond to a single injection opening (single nozzle) or to a combination of multiple individual injection openings (multiple nozzles).

Preferably, the first swirler and the second swirler are designed to confer a different swirl to respectively the first peripheral gas jet (first swirl) and to the second peripheral gas jet (second swirl). In this manner, it is possible to control the global flame appearance and properties, and in particular the global flame length, by modifying the ratio of the flow rate of the first peripheral gas jet to the flow rate of the second peripheral gas jet.

In the present context, the term "global flame" refers to the flame generated by the injected fuel with all of the injected oxidizers. The global flame thus differs from the primary flame which is generated by the partial combustion of the injected fuel with the primary oxidizer only.

The first and second swirler can advantageously be designed to confer to the first and second peripheral gas jets swirls with opposite senses of rotation around the primary flame, i.e. one swirl with a positive swirl and one with a negative swirl. For example, the first swirler may confer a clockwise swirl to the first peripheral gas jet (i.e. clockwise with respect to the flow or propagation direction of the jet and the second swirler may confer a counterclockwise swirl to the second peripheral jet or vice-versa.

Alternatively, the first and second swirler may be designed to confer to the first and second peripheral gas jets swirls with the same sense of rotation around the primary flame, but with a different amplitude; i.e. a more rapidly swirling/rotating first peripheral gas jet and a more slowly swirling/rotating second peripheral gas jet or vice-versa.

The first and second swirlers of the burner according to the present invention preferably each comprise a set of swirl vanes and whereby the vanes of the first swirler have a greater swirl angle than the vanes of the second swirler. The swirl angle of the vanes is the angle between the vane and the main flow or propagation direction of the jet, which, in the context of the present invention, coincides with the main propagation direction of the primary flame.

Preferably, the swirl angle of the vanes of the second swirler is from one third (⅓) to two thirds (⅔) of the swirl angle of the vanes of the first swirler.

The swirl angle of the vanes of the first swirler is preferably between 45° and 65°, more preferably between 50° and 60°.

According to one embodiment of the invention, the first swirler is designed to confer to the first peripheral gas jet a swirl which is divergent with respect to the primary flame. According to a further embodiment of the invention, the second swirler is designed to confer onto the second peripheral gas jet a swirl which is convergent with respect to the primary flame. These two embodiments may be combined in a third embodiment, whereby the first swirler is designed to generate a divergent first swirl and the second swirler is designed to generate a divergent second swirl.

The primary oxidizer injector preferably surrounds the fuel injection passage. In that case, the primary oxidizer jet is injected in the combustion zone around the fuel jet. The fuel injection passage can be a fuel lance. Said lance is advantageously mounted in the burner assembly so as to be removable from the burner assembly without requiring access to the combustion zone, i.e. from the cold side of the burner. In order to facilitate the removal and installation of the fuel injection passage, it is preferable that the primary oxidizer surrounds the fuel injection passage and/or that the fuel injection passage is the innermost passage of the burner assembly. A removable fuel injection passage facilitates burner maintenance and also increases the flexibility of the burner in that it is possible to replace a fuel lance specifically adapted for the injection of a first fuel with a fuel lance adapted for the injection of a different fuel. The burner according to the present invention can thus be used for the combustion of different fuels, such as gaseous fuels, liquid fuels and pulverized solid fuels and can switch between different fuels without major intervention to the furnace. Liquid and pulverized solid fuels are typically injected by means of a carrier gas.

As is known in the state of the art, the fuel lance may comprise an igniter and/or a pilot burner.

The primary oxidizer passage may be equipped so as to inject at least part of the primary oxidizer gas jet into or towards the first peripheral gas jet, for example by means of a suitable orientation of the primary oxidizer passage outlet or by means of one or more oriented primary oxidizer injector nozzles.

According to a preferred embodiment of the invention, the secondary oxidizer injection passage surrounds the first peripheral gas injection passage and the secondary oxidizer injection passage is in turn surrounded by the second peripheral gas injection passage. This permits an even spread of the secondary oxidizer injection around the primary flame.

The secondary oxidizer injection passage may be equipped with a multitude of secondary oxidizer injection nozzles. In that case the secondary oxidizer jet is divided in a multitude of sub-jets of secondary oxidizer. The secondary oxidizer injection passage may advantageously be equipped with between 10 and 50 secondary oxidizer injection nozzles, preferably between 20 and 40 secondary oxidizer injection nozzles. Such secondary oxidizer injection nozzles are preferably evenly distributed around the outer circumference of the first peripheral gas injection passage. The secondary oxidizer nozzles can be designed or positioned so as to inject secondary oxidizer with an angle (≠0°) with respect along the main fluid flow or propagation direction of the burner assembly. For example, the secondary oxidizer nozzles can be designed or positioned so as to inject the secondary oxidizer with a direction towards the primary oxidizer and fuel jets and/or so as to inject the secondary oxidizer in direction(s) at least partially tangential to the main fluid flow or propagation direction of the burner assembly.

The fuel injection passage is usefully centrally positioned within the burner assembly.

The burner may thus have a burner axis which defines an axis of symmetry of the injection passages, the burner axis being directed along the main fluid flow or propagation direction of the burner assembly.

The burner assembly typically comprises a burner block through which the respective injection passages pass. Such a burner block is typically made of mineral or ceramic refractory material and facilitates the integration of the burner assembly in the walls of the combustion chamber. In that case, the burner assembly typically comprises a burner block and a metallic injector assembly defining the respective injection passages within the block. In some cases, the outermost injection passage may be defined by the outermost surface of the metallic injector assembly and the inner surface of the through bore in the burner block in which the metallic injector assembly is mounted.

In other cases, the outermost injection passage may be defined by two tubular structures of the metallic injector assembly, whereby one tubular structure is located with the other.

The outermost injection passage is typically the second peripheral gas injection passage.

According to the present invention, the injector passages may all terminate substantially in a single plane, whereby said plane is typically perpendicular to the longitudinal direction of the fuel injection passage, to the main fluid flow direction or to the main propagation direction of the burner assembly, or, if the burner assembly has an axis of symmetry, perpendicular to said burner axis.

When the burner assembly comprises a burner block, the injector passages may all terminate substantially in the outlet face of the burner block or they may terminate upstream of the burner block outlet face. The latter provides some protection to the metallic injector assembly against thermal damage arising from the heat generated in the combustion zone and from pollutants in said zone.

As will be explained below, the burner assembly may comprise a supply pipe for peripheral gas which is connected both to the first and to the second peripheral gas injection passages. Such a peripheral gas supply pipe may then be equipped with a gas distributor for controlling the proportion of peripheral gas supplied by the peripheral gas supply pipe flowing into respectively the first and the second peripheral gas injection passages.

The present invention also relates to a combustion chamber comprising at least one burner according to any one of the above-described embodiments of the invention. The present invention more specifically relates to a boiler comprising such a combustion chamber.

The present invention further relates to a method of combusting a fuel with an oxidizer. According to said method a jet of fuel and a jet of primary oxidizer are injected into a combustion zone. The jet of primary oxidizer injects an amount of oxygen corresponding to between 10% and 50% of the amount of oxygen required for the stoichiometric combustion of the jet of fuel. Said jet of primary oxidizer is injected into the combustion zone in contact with the jet of fuel, thereby generating a primary fuel-rich flame in the combustion zone. A first and a second peripheral gas jet are also injected into the combustion zone. The first peripheral gas jet is injected into the combustion zone around the fuel jet and the primary oxidizer jet, i.e. around the primary fuel-rich flame and the second peripheral gas jet is injected into the combustion zone around the first peripheral gas jet and therefore indirectly also around the fuel jet and the primary oxidizer jet/around the primary flame. The first peripheral gas jet is injected with a first swirl with respect to the primary flame and the second peripheral gas jet is injected with a second swirl with respect to the primary flame. According to the present invention, a jet of secondary oxidizer is injected into the combustion zone between the first and second peripheral gas jets.

Preferably, the jet of primary oxidizer injects an amount of oxygen into the combustion zone which corresponds to between 15% and 40% of the amount of oxygen required for the stoichiometric combustion of the jet of fuel. In that case, the secondary oxidizer advantageously injects the remainder of the oxygen required for the complete combustion of the fuel, i.e. 85% to 60% of the amount of oxygen required for the stoichiometric combustion of the jet of fuel or a minor excess thereof.

The primary oxidizer and the secondary oxidizer are suitably oxygen-rich gas having on oxygen content of between 80% vol and 100% vol. The first and the second peripheral gas jets each are suitably jets of air or of a ballast gas containing from 0% vol to 19% vol oxygen and from 0% vol to 50% vol of nitrogen. As already explained above with respect to the burner assembly of the invention, the first and second peripheral gas jets preferably have different swirls (first, respectively second swirl) with respect to the primary flame. For example, the first swirl and the second swirl may have opposite senses of rotation (one clockwise and one counterclockwise around the primary flame). The first and the second swirl may also have a same sense of rotation, but a different swirl angle. The swirl angle of the first peripheral gas jet is referred to as the first swirl angle and the swirl angle of the second peripheral gas jet is referred to as the second swirl angle. Advantageously, the second swirl angle is from 1/3 to 2/3 of the first swirl angle. The first swirl angle is preferably between 45° and 65°, more preferably between 50° and 60°.

According to an embodiment of the present invention, the first swirl is divergent with respect to the primary flame. The second swirl may be convergent with respect to the primary flame. Usefully, the method combines a divergent first swirl and a convergent second swirl.

According to a preferred embodiment of the invention, the primary oxidizer jet is injected around the fuel jet.

Advantageously, the secondary oxidizer jet is injected around the first peripheral gas jet and the second peripheral gas jet is injected around the secondary oxidizer jet.

The secondary oxidizer jet may in particular consist of a multitude of secondary oxidizer sub-jets. This can in particular be achieved by dividing the secondary oxidizer flow into a multitude of sub-jets by means of a multitude of secondary oxidizer injector nozzles, typically between 10 and 50 secondary oxidizer subjects, preferably between 20 and 40 sub-jets. When the secondary oxidizer is injected in the form of a multitude of sub-jets, said sub-jets are advantageously evenly distributed around primary flame.

Advantageously, the fluid jets are injected in a symmetrical pattern around an axis of symmetry. The jet of fuel is preferably injected into the combustion zone centrally with respect to the jet of primary oxidizer, with respect to the first peripheral gas jet and with respect to the second peripheral gas jet. The jet of fuel, the jet of primary oxidizer, the first peripheral gas jet, the jet of secondary oxidizer and the second peripheral gas jet may in particular present a common point of symmetry at their respective points of injection into the combustion.

The burner and the method according to the present invention are highly flexible. They can be used for air-fuel combustion, for oxygen-fuel combustion and for oxygen-enriched air-fuel combustion. They are furthermore suitable for use in narrow combustion spaces, where the maximum allowable flame length is limited, as they permit an effective control of the flame length in different operation regimes.

The present invention thus allows the first and the second peripheral gas jets to be jets of air. When the first and secondary oxidizer jets and the first and second peripheral gas jets are all combustion air, the method is a fully air-fuel combustion method. The flow of secondary oxidizer may, in this embodiment, be limited to the flow necessary to keep the one or more secondary oxidizer injection nozzles clean and unblocked. The present invention thus permits an operator to operate the burner and the method with only air as the oxidizer and without FGR.

When the first and second peripheral gas jets are air jets, the primary and/or the secondary oxidizer jets preferably consist of an oxygen-rich gas. In that case, the method is an oxygen-enriched air-fuel combustion method. It is, in particular, preferred that at least the primary oxidizer jet consists of an oxygen-rich gas.

In the context of the present invention, the term "oxygen-rich gas" refers to a gas containing between 80% vol and 100% vol of oxygen. In general, substantially pure oxygen, containing from 95% vol to 100% vol oxygen, is preferred as oxygen-rich gas. When the secondary oxidizer is an oxygen-rich gas, oxygen-enrichment takes place between the first and second peripheral gas jets. When the primary oxidizer is an oxygen-rich gas, oxygen-enrichment takes place at the level of the primary flame. When the primary oxidizer is an oxygen-rich gas, part of the primary oxidizer can advantageously, at least in part, be injected into or towards the first peripheral gas jet so as to reduce the temperature of the primary flame, thereby reducing NOx generation.

According to an alternative embodiment of the method, the first peripheral gas jet consists of ballast gas and the second peripheral gas jet is an air jet. In that case, the secondary oxidizer is preferably an oxygen-rich gas. The primary oxidizer may be an oxygen-rich gas or air. In the context of the present invention, a ballast gas is a gas containing from 0% vol to 19% vol oxygen and from 0% vol to 50% vol nitrogen. Preferably, the ballast gas contains from 0% vol to 10% vol oxygen and from 0% vol to 30% vol nitrogen. Suitable ballast gases are recycled combustion gases (also referred to as flue gas), steam and $CO_2$-rich gas (containing typically from 80% vol to 100% vol $CO_2$). According to this low-NOx oxygen-enriched air-fuel combustion method, part of the stoichiometric combustion air is replaced by a combination of ballast-gas and oxygen-rich gas.

According to an alternative low-NOx method, the first and second peripheral gas jets are jets of ballast gas and the primary and secondary oxidizer jets are oxygen-rich gas. In this case, the combustion air is entirely replaced by a combination of ballast gas and oxygen-rich gas and the method is an oxygen-fuel combustion method. As indicated above, at least part of the oxygen-rich primary oxidizer is advantageously be injected into or towards the first peripheral gas jet.

The fuel may be any liquid or gaseous fuel. If it is a gas, the fuel may be natural gas, mine gas, coke oven gas, blast furnace gas, refinery gas or syngas. If it is a liquid, the fuel can be selected from home-heating oil, heavy fuel oil, asphalt, refinery residue, crude oil.

The fuel may also be a particulate solid fuel entrained by a carrier gas or a carrier liquid.

The method according to the present invention advantageously makes use of a burner assembly according to any one of the above-described embodiments.

As indicated above, when the burner Assembly comprises a fuel injection passage which can be removed from the cold side of the burner assembly, it is possible to replace the fuel injection passage with minimal intervention in the thermal process and in particular without having to interrupt the thermal process.

The present invention relates in particular to the use of the method for generating steam in a boiler.

BRIEF DESCRIPTION OF THE FIGURES

FIG. 1 is a schematic partial (top half) representation in longitudinal cross section of a burner assembly according to the invention.

DETAILED DESCRIPTION OF THE INVENTION

The illustrated burner assembly presents an axial symmetry around axis X-X.

The burner assembly comprises a refractory burner block 10 with a through passage 11 in which a metallic injector assembly 100 is mounted.

The injector assembly has a central fuel lance 110 through which a jet of fuel (schematically represented by arrows 210) is injected into the downstream combustion zone 1.

Fuel lance 110 is surrounded by a first oxidizer passage 140 through which a primary oxidizer (arrows 240, 241) is injected into combustion zone 1 through nozzles. Inside combustion zone 1, fuel 210 partially combusts with primary oxidizer 241 in a fuel-rich primary flame 200.

Primary oxidizer passage 140 is in turn surrounded by first peripheral gas passage 120 for the injection of a first peripheral gas (arrow 220) into combustion zone 1 after having passed through first vane swirler 121. First swirler 121 has a swirl angle of 55°.

First peripheral gas injection passage 120 in turn surrounded by secondary oxidizer passage 150 for the injection of a jet of secondary oxidizer (arrows 250, 251) into combustion zone 1. Secondary oxidizer passage 150 is equipped with a large number of injection nozzle 151 evenly distributed around axis X-X, so that secondary oxidizer 250 is injected in the form of a large number of sub-jets 251 evenly distributed around primary flame 200.

Secondary oxidizer passage 130 is surrounded by second peripheral gas injection passage 130 through which a second peripheral gas jet (arrow 230) is injected into combustion zone 1 after having passed through second vane swirler 131. Second swirler 131 has a vane angle of 35° and has the same swirl orientation as first swirler 121.

In the illustrated embodiment, second peripheral gas passage 130 is defined by the outer surface of metallic assembly 100 (outer wall of secondary oxidizer passage 150) and the inner surface of the through passage 11 of burner block 11.

A portion (arrow 242) of primary oxidizer 240 is furthermore injected into first peripheral gas passage 140, thereby further increasing the fuel richness of primary flame 200.

Through controlling the flow rate of the first peripheral gas jet injected with the first swirl, the flow rate of the second peripheral gas jet injected with the second swirl and the ratio between the flow rates of the first and the second peripheral gas jet, analogous flame lengths can be obtained in air-fuel combustion without FGR, in oxygen-fuel gas combustion with FGR and with oxygen-enriched air-fuel combustion at substantially identical burner power.

Consequently, when using the present invention, it is no longer necessary to design the combustion chamber in function of a specific choice of combustion oxidizer, nor is it necessary always to use the same combustion oxidizer within a given combustion chamber.

The present invention furthermore provides for low-NOx combustion using different types of combustion oxidizer are used. Additionally, the present invention enables low-NOx combustion and produces high-$CO_2$ flue gas suitable for $CO_2$ capture and sequestration when operating in oxygen-combustion mode.

For those thermal processes for which the environmental constraints do not yet commercially justify oxygen-fuel operation, the present invention thus provides equipment allowing initial air-fuel combustion and an easy and rapid switch to environmentally friendly oxygen-fuel combustion at the opportune moment in time. As a consequence, operators of thermal processes can, by virtue of the invention, install, within their combustion chamber, equipment suitable for low-NOx and high $CO_2$ combustion, even if they have not yet decided to operate in oxygen-fuel combustion mode and still wish to operate in air-fuel combustion mode. The switch from air-fuel combustion to oxygen-fuel combustion can then easily be realized within a same combustion chamber with very limited intervention to the combustion installation.

In this manner, the present invention provides an important tool for promoting environmentally friendly oxygen-fuel combustion.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A burner assembly comprising:
   a fuel injection passage for injecting a jet of fuel into a combustion zone;
   a primary oxidizer injection passage for injecting a jet of primary oxidizer into the combustion zone in contact with the jet of fuel to generate a primary flame in the combustion zone;
   a first peripheral gas injection passage for injecting a first peripheral gas jet through a first peripheral injection cross section area into the combustion zone around the fuel jet and the primary oxidizer jet, the first peripheral gas injection passage surrounding the fuel injection passage and the primary oxidizer passage and being equipped with a first swirler for conferring to the first peripheral gas jet a first swirl with respect to the primary flame;
   a second peripheral gas injection passage for injecting a second peripheral gas jet through a second peripheral injection cross section area into the combustion zone around the first peripheral gas jet, the second peripheral gas injection passage surrounding the first peripheral gas injection passage and being equipped with a second swirler for conferring to the second peripheral gas jet a second swirl with respect to the primary flame; and
   a secondary oxidizer injection passage for injecting a jet of secondary oxidizer through a secondary oxidizer injection cross section area into the combustion zone, the secondary oxidizer injection passage being located between the first and second peripheral gas injection passages, wherein the secondary oxidizer injection cross section area is between one tenth and one thirtieth of a sum of the first and second peripheral injection cross section areas;
   wherein the first swirler is adapted and configured to confer a swirl to the first peripheral gas jet and the second swirler is adapted and configured to confer a swirl to the second peripheral gas jet different than that of the first peripheral gas jet, the difference between the swirls of the first and second swirlers selected from the group consisting of: a direction of rotation around the primary flame, a rapidity of the swirling, a swirl angle of vanes of the swirlers, and whether the swirl is convergent or divergent.

2. The burner assembly of claim 1, wherein:
   the primary and the secondary oxidizer injection passages are connected to a source of oxygen-rich gas having an oxygen content of between 80% vol and 100% vol; and
   the first and second peripheral gas injection passages are connected to a source of air or to a source of a ballast gas containing from 0% vol to 19% vol oxygen and from 0% vol to 50% vol nitrogen.

3. The burner assembly of claim 1, wherein the primary oxidizer injection passage surrounds the fuel injection passage.

4. A boiler comprising a combustion chamber equipped with at least one the burner assemblies of claim 1.

5. A method of combusting a fuel with an oxidizer in a combustion zone, comprising the steps of:
   injecting a jet of fuel into the combustion zone;
   injecting a jet of primary oxidizer into the combustion zone in contact with the jet of fuel to generate a primary fuel-rich flame;
   injecting a first peripheral gas jet through a first peripheral injection cross section area into the combustion zone around the fuel jet and the primary oxidizer jet, said first peripheral gas jet having a first swirl with respect to the primary flame;
   injecting a second peripheral gas jet through a second peripheral injection cross section area into the combustion zone around the first peripheral gas jet, said second peripheral gas jet having a second swirl with respect to the primary flame, wherein the jet of primary oxidizer injects an amount of oxygen corresponding to between 10% and 50% of an amount of oxygen required for stoichiometric combustion of the jet of fuel; and
   injecting a jet of secondary oxidizer through a secondary oxidizer injection cross section area into the combustion zone between the first and second peripheral gas jets, wherein the second oxidizer injection cross section area is between one tenth and one thirtieth of a sum of the first and the second peripheral injection cross section areas;
   wherein the first swirler is adapted and configured to confer a swirl to the first peripheral gas jet and the second swirler is adapted and configured to confer a swirl to the second peripheral gas jet different than that of the first peripheral gas jet, the difference between the swirls of the first and second swirlers selected from the group consisting of: a direction of rotation around the primary flame, a rapidity of the swirling, a swirl angle of vanes of the swirlers, and whether the swirl is convergent or divergent.

6. The method of claim 5, wherein:
   each of the primary oxidizer and the second oxidizer is an oxygen-rich gas having on oxygen content of between 80% vol and 100% vol; and
   first and the second peripheral gas jets are jets of air or jets of a ballast gas containing from 0% vol to 19% vol oxygen and from 0% vol to 50% vol of nitrogen.

7. The method of claim 5, wherein the primary oxidizer jet is injected around the fuel jet.

8. The method of claim 5, wherein the first and second peripheral gas jets are jets of air.

9. The method of claim 5, wherein the first peripheral gas jet consists essentially of ballast gas and the second peripheral gas jet is an air jet.

10. The method of claim 5, wherein the first and second peripheral gas jets are jets of ballast gas.

11. A method of generating steam in a boiler, comprising the steps of:
- injecting a jet of fuel into the combustion zone;
- injecting a jet of primary oxidizer into the combustion zone in contact with the jet of fuel to generate a primary fuel-rich flame;
- injecting a first peripheral gas jet through a first peripheral injection cross section area into the combustion zone around the fuel jet and the primary oxidizer jet, said first peripheral gas jet having a first swirl with respect to the primary flame;
- injecting a second peripheral gas jet through a second peripheral injection cross section area into the combustion zone around the first peripheral gas jet, said second peripheral gas jet having a second swirl with respect to the primary flame, wherein the jet of primary oxidizer injects an amount of oxygen corresponding to between 10% and 50% of an amount of oxygen required for stoichiometric combustion of the jet of fuel;
- injecting a jet of secondary oxidizer through a secondary oxidizer injection cross section area into the combustion zone between the first and second peripheral gas jets, wherein the second oxidizer injection cross section area is between one tenth and one thirtieth of a sum of the first and the second peripheral injection cross section areas; and
- using heat from combustion of the jet and oxidizers to generate steam;
- wherein the first swirler is adapted and configured to confer a swirl to the first peripheral gas jet and the second swirler is adapted and configured to confer a swirl to the second peripheral gas jet different than that of the first peripheral gas jet, the difference between the swirls of the first and second swirlers selected from the group consisting of: a direction of rotation around the primary flame, a rapidity of the swirling, a swirl angle of vanes of the swirlers, and whether the swirl is convergent or divergent.

* * * * *